(12) United States Patent
Keller et al.

(10) Patent No.: US 7,849,621 B2
(45) Date of Patent: Dec. 14, 2010

(54) FASTENING DEVICE FOR AN ACCESSORY

(75) Inventors: Markus Keller, Leonberg (DE);
Heinz-Arno Kruschhausen,
Wiernsheim (DE); Adrian Beer,
Böblingen (DE)

(73) Assignee: Dr. Ing. h.c. F. Porsche AG, Suttugart (DE)

( * ) Notice: Subject to any disclaimer, the term of this patent is extended or adjusted under 35 U.S.C. 154(b) by 648 days.

(21) Appl. No.: 11/821,669

(22) Filed: Jun. 25, 2007

(65) Prior Publication Data

US 2008/0005874 A1   Jan. 10, 2008

(30) Foreign Application Priority Data

Jun. 24, 2006  (DE) .................. 10 2006 029 173

(51) Int. Cl.
*G09F 3/06* (2006.01)
(52) U.S. Cl. .................. 40/643; 24/1; 24/458
(58) Field of Classification Search .............. None
See application file for complete search history.

(56) References Cited

U.S. PATENT DOCUMENTS

| | | | |
|---|---|---|---|
| 3,746,378 A | 7/1973 | Meyer | |
| 3,871,089 A * | 3/1975 | Kunz | 24/114.3 |
| 4,035,874 A * | 7/1977 | Liljendahl | 24/114.4 |
| 6,581,311 B1 | 6/2003 | Davey et al. | |

FOREIGN PATENT DOCUMENTS

| | | |
|---|---|---|
| DE | 37 04 190 A1 | 12/1987 |
| DE | 89 03 289 U1 | 7/1989 |
| DE | 101 19 130 A1 | 10/2002 |
| DE | 10211660 A1 | 10/2003 |
| WO | WO 01/10681 A1 | 2/2001 |

* cited by examiner

*Primary Examiner*—Jack W. Lavinder

(57) ABSTRACT

A fastening device for fastening an accessory to a body part. The fastening device has a support element and a holding element. The support element is mounted to the body part from an exposed side and the holding element is mounted from a hidden side. The holding element has undercut elements via which it reaches from the hidden side through corresponding openings in the body part and reaches behind holding contours formed on the body part such that it is automatically fixed on the body part.

14 Claims, 2 Drawing Sheets

FASTENING DEVICE FOR AN ACCESSORY

CROSS-REFERENCE TO RELATED APPLICATION

This application claims the priority, under 35 U.S.C. §119, of German application DE 10 2006 029 173.5, filed Jun. 24, 2006; the prior application is herewith incorporated by reference in its entirety.

BACKGROUND OF THE INVENTION

Field of the Invention

The present invention relates to a fastening device for an accessory for fastening to a body part. The fastening device has a support element and a holding element. In the fitted state, the support element is arranged on the body part from an exposed side and the holding element from a non-exposed side.

In state of the art motor vehicle manufacturing, it is customary to connect accessories, such as, for example, a brand name emblem, to an associated body part via a latching or clip connection. The accessories are thereby fastened to the vehicle or to the body part preferably in a final manufacturing step during the final assembly of the motor vehicle. The fastening in this case is to be designed in such a manner that a later inexpert detachment of the accessory, for example during a theft, is at least made difficult.

U.S. Pat. No. 6,581,311 B1 and international patent application WO 01/10681 A1 disclose a fastening device for an accessory in the form of a type plate for fastening to a body part. The fastening device here essentially comprises a support element, which is arranged on the body part from a visible side and bears a visible type designation, and a holding element, which is arranged on the body part from a hidden side and at the same time forms a mating latching element for latching elements formed on the support element. In this case, the latching elements of the support element have a plurality of barbs which permit a virtually infinitely variable latching of the latching elements in the mating latching element.

Further fastening devices for fastening accessories to body components are known, for example, from German published patent application DE 37 04 190 A1 and German utility model G 89 03 289 U1 (Gebrauchsmuster).

SUMMARY OF THE INVENTION

It is accordingly an object of the invention to provide a fastening device, which overcomes the above-mentioned disadvantages of the heretofore-known devices and methods of this general type and which is improved to permit the operation to install the fastening device to be divided into a plurality of installation steps.

With the foregoing and other objects in view there is provided, in accordance with the invention, a fastening device for fastening an accessory to a body part, the body part having an exposed side and a non-exposed side and the fastening device comprises:

a support element configured to be mounted on the exposed side of the body part;

a holding element configured to be mounted on the non-exposed side of the body part;

the holding element including undercut elements configured to reach, in the fitted state thereof, from the non-exposed side through corresponding openings formed in the body part and to engage behind holding contours formed on the body part.

In accordance with an added feature of the invention, the support element has support latching elements each formed with mutually opposite latching lugs, the holding element has mating latching elements, and, in a fitted state, the latching lugs of the support latching elements latch to corresponding ones of the mating latching elements of the holding element, wherein the latching elements of the support element reach through corresponding openings in the body part and in the holding element, and the mating latching elements are disposed on a side of the holding element facing away from the support element.

The terms visible, exposed, and accessible are synonyms with regard to the invention described herein. Similarly, the opposites hidden, non-visible, non-exposed, and inaccessible are synonyms as well.

The present invention is based on the general concept of providing, in the case of a fastening device which has a support element and a holding element and is intended for fastening an accessory to a body part, undercut elements on the holding element, via which the holding element reaches from a rear hidden side through corresponding openings in a body part and interlocks with holding contours formed on the body part. The holding element can therefore be fastened to the body part in a first installation step while a support element, which bears, for example, an emblem or a coat of arms, can be connected to the holding element or to the body part in a further installation step, for example at a different factory. The undercut elements enable the holding element to be fixed to the body part in a reliable and automatic manner, and therefore an interruption to the installation process is easily possible.

The support element expediently has at least one first positioning opening in which at least one associated positioning lug of the accessory engages. The positioning lugs of the accessory, which positioning lugs interact with the positioning openings on the support element, therefore ensure exact positioning of the accessory with respect to the support part, which is of great advantage in particular for gap dimensions which influence the design. At the same time, the positioning lugs make it easier to exactly fit the accessory to the support element, and therefore the installation operation can be executed in a qualitatively better manner and in a shorter time.

In an advantageous embodiment of the invention, the support element has latching tongues which interact with mating latching contours arranged on the body part and fix the support element fixedly to the body part. In this case, the latching tongues bring about, in addition to the undercut elements, a fixing of the holding element on the body part, and so said holding element can be arranged in a fixed position on the body part in a first working step. Furthermore, the latching tongues prevent the position of the holding element from being able to be displaced in relation to the body part, and therefore the body part can easily be moved to a further working station without there having to be a concern that the holding element will be displaced with respect to the body part in the meantime.

In a further advantageous embodiment, the support element has opposite latching lugs which are arranged on each latching element and, when the support element is fitted on the holding element, are latched to mutually opposite mating latching lugs of the holding element. Such an arrangement of latching elements and mating latching elements necessitates access from the hidden side, i.e. from the side on which the holding element is arranged, in order to release the fastening device. An unauthorized or undesirable removal of the accessory is therefore made considerably more difficult if the hidden side is accessible only by removal of a further part, for example the body part. The latching therefore provides increased theft protection for the accessory.

The support element and/or the holding element are expediently each designed as a single-part plastic component. In this case, it can be provided that the support element and/or the holding element are produced by injection molding, as a result of which high quality and at the same time cost-effective structural elements can be produced.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a fastening device for an accessory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
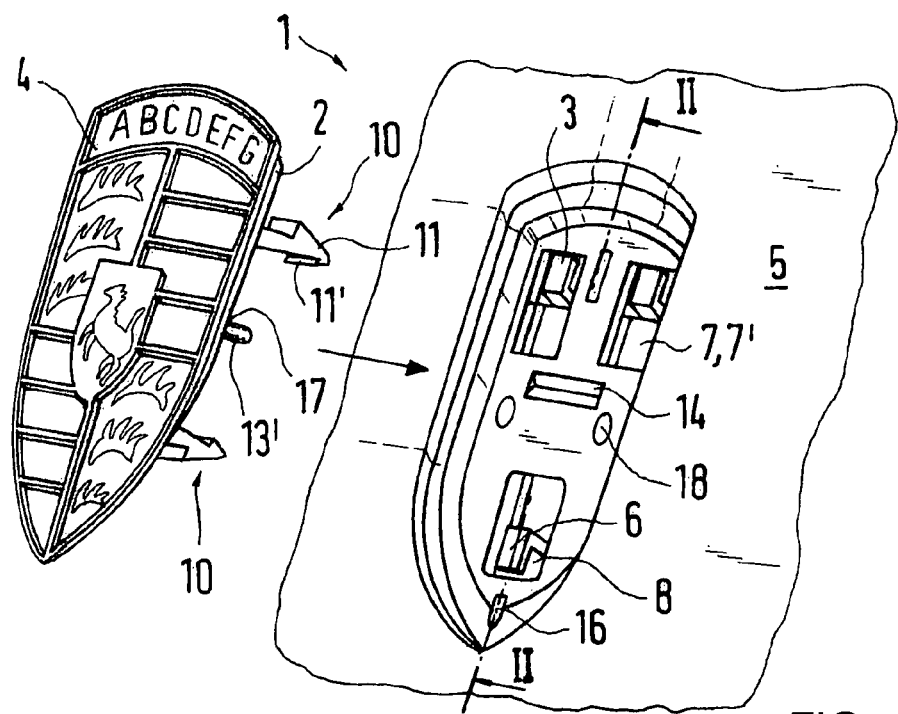
FIG. 1 is a perspective, exploded view showing a fastening device according to the invention for an accessory for fastening to a body part.

Referring now to the figures of the drawing in detail and first, particularly, to FIG. 1 thereof, a fastening device 1 according to the invention has a support element 2 and a holding element 3. The fastening device 1 serves to fasten an accessory 4, for example a coat of arms or an emblem, to a body part 5, i.e., a bodyworks part or a part of a vehicle chassis. The support element 2 is mounted on the body part 5 from an exposed side while the holding element 3 is mounted on the body part 5 from a hidden or non-exposed side. In order to be able to divide an operation for installing the fastening device 1 into a plurality of working steps, undercut elements 6 are provided on the holding element 3, via which the holding element 3 reaches from the hidden side through corresponding openings 7 in the body part 5 and engages behind holding contours 8 on the body part. The undercut elements 6 are matched in size to the size of the openings 7 in the body part 5 in such a manner that the holding element 3 can first of all be placed through the openings 7 in the normal direction of the body part 5 and is then displaced essentially parallel to the plane of the body part 5 in such a manner that the undercut elements 6 engage around or behind the holding contours 8 on the body and, as a result, are connected fixedly to the body part 5.

Figure 3:
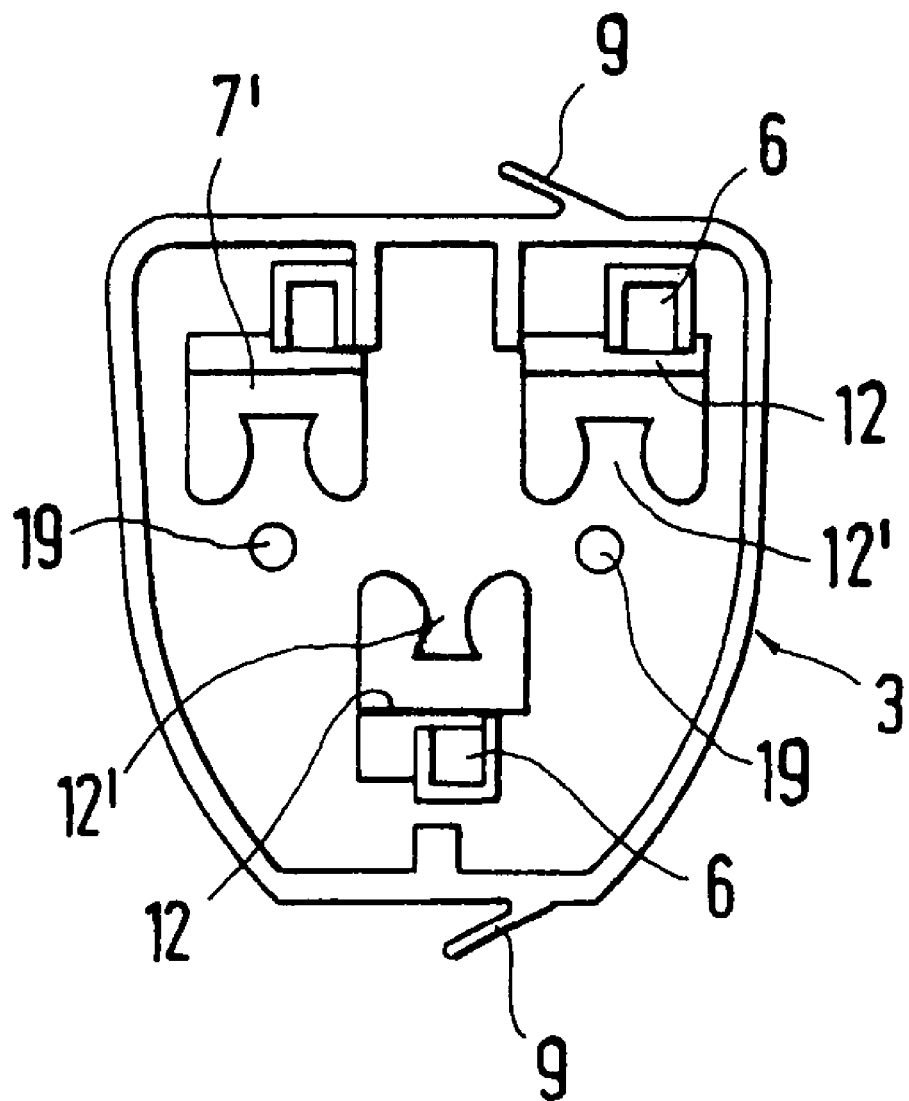
FIG. 3 is a view of a holding element from a side facing away from the body part.

In addition, latching tongues 9 (cf. FIG. 3) can be formed on the holding element 3 and interact with or latch to mating latching contours formed on the body part 5 and, as a result, fix the holding element 3 fixedly or captively to the body part 5. The holding element 3 can therefore be latched reliably to the body part 5 such that all of the work required from a hidden side of the body part 5 can be completed, and the further fitting of the fastening device 1, i.e. the clipping in of the support element 2, can take place exclusively from the visible side.

Figure 2:
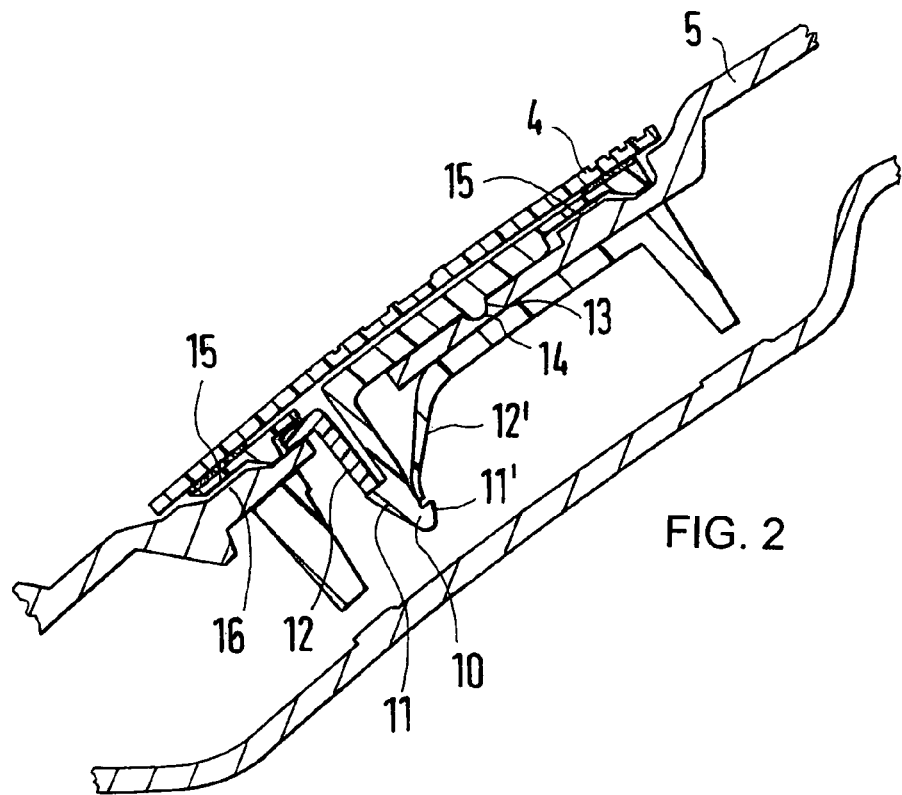
FIG. 2 is a cross section through the fastening device taken in the plane II-II.

According to FIG. 1, the support element 2 has opposite latching lugs 11 and 11' formed on each latching element 10. When the fastening device 1 is completely fitted, the latching lugs 11 and 11' of the latching element 10 latch to mutually opposite mating latching elements 12 and 12' of the holding element 3 (cf. FIGS. 2 and 3). According to the invention, the mating latching elements 12 and 12' of the holding element 3 are arranged on a side of the holding element 3 that faces away from the support element 2, and therefore said mating latching elements are accessible only from a hidden side. According to FIG. 3, the mating latching element 12 is designed as a latching edge or latching contour while the mating latching element 12' of the holding element 3 is designed as a spring-elastic tongue. The mutually opposite latching has the effect that, in order to release the fastening device 1, access to the hidden side has to be provided, since otherwise, even if the latching elements 10 are twisted, one latching lug 11 or 11' in each case remains latched to the associated mating latching element 12 or 12'. The mutually opposite latching therefore provides increased theft protection.

In order to be able to latch to one another, the latching elements 10 of the support element 2 have to reach through corresponding openings 7 in the body part 5 and corresponding openings 7' in the holding element 3.

In order to simplify the positioning of the support element 2 on the body part 5 or in relation to the holding element 3, the support element 2 has at least one positioning lug 13 (cf. FIG. 2) which faces the body part 5 and, when the accessory 4 is fitted, engages in a positioning recess 14, formed in a complementary manner thereto, on the body part 5 (cf. FIG. 1).

Furthermore, it is conceivable that the support element 2 has at least one positioning notch 15 which faces the body part 5 and interacts with a positioning bump 16 arranged on the body part 5. It can furthermore be provided here that the positioning lug 13 is provided for positioning the support element 2 in the X direction in relation to the body part 5 while the positioning notch 15 on the support element 2 serves for positioning in the Y direction in relation to the body part 5.

In order to be able to position and fix the accessory 4 on the support element 2 easily and in an exact position, the support element 2 has at least one first positioning opening 17 (cf. FIG. 1) in which at least one associated positioning lug 13' of the accessory 4 engages. Opposite said opening, the body part 5 has a second positioning opening 18 (cf. FIG. 1) which is arranged in alignment with the at least one first positioning opening 17 of the support element 2. A third positioning opening 19 is provided on the holding element 3, likewise arranged in alignment with the at least one first positioning opening 17 of the support element 2. In this case, the positioning lug 13' of the accessory 4 can engage either through the first positioning opening 17 on the support element 2 and the second positioning opening 18 on the body part 5 or else in all three positioning openings 17, 18 and 19.

In order to be able to produce the fastening device 1 as cost-effectively as possible and with low unit costs, the support element 2 and/or the holding element 3 are each designed as a single-part plastic component and produced, for example, by injection molding.

The characteristic features of the fastening device 1 according to the invention will be explained briefly below:

The holding element 3 of the fastening device 1 is inserted by means of its undercut elements 6 from a hidden side through the opening 7 in the body part 5 and then displaced in the direction running essentially parallel to the plane of the body part until the undercut elements 6 engage behind the holding contours 8 on the body. When the holding element 3 is completely displaced into its end position, then latching tongues 9 arranged on the holding element 3 latch to corresponding mating latching contours (not shown) arranged on the body part 5, and therefore the holding element 3 is fixed fixedly to the body part 5. The body part 5 can now be connected, for example, to the motor vehicle, to be precise, also in such a manner that a hidden side of the body part 5 is no longer accessible. The support element 2 with the accessory 4, for example a brand name emblem, arranged thereon can now be latched to the holding element 3 by simple pressing on from the visible side and, as a result, can be fixed fixedly to the body part 5. The special design of the latching elements 10 with two opposite latching lugs 11 and 11' enables latching to correspondingly opposite mating latching elements 12 and 12' to be achieved, such that detachment of the accessory 4 solely from the visible side is no longer possible, thus making it impossible to steal the accessory 4 without destroying the fastening device 1. The automatic fastening of the holding element 3 to the body part 5 makes it possible to carry out the final attachment of the support element 2 to the body part 5 also at a later time, i.e. in a later working step.

The invention claimed is:

1. A fastening device for fastening an accessory to a body part, the body part having an exposed side and a non-exposed side opposite from the exposed side, the fastening device comprising:
   a support element configured to be mounted, in a fitted state thereof, on the exposed side of the body part;
   a holding element configured to be mounted, in a fitted state thereof, on the non-exposed side of the body part;
   said holding element including undercut elements configured to reach, in the fitted state thereof, from the non-exposed side through corresponding openings formed in the body part and to engage behind holding contours formed on the body part; and
   said holding element having latching tongues which, in the fitted state thereof, interact with mating latching contours formed on the body part and mount said holding element fixedly on the body part.

2. The fastening device according to claim 1, wherein said support element is formed with at least one first positioning opening configured to receive, in the fitted state, at least one associated positioning lug of the accessory.

3. The fastening device according to claim 2, wherein the body part is formed with a second positioning opening which is aligned, in the fitted state, with the at least one first positioning opening in said support element.

4. The fastening device according to claim 3, wherein said holding element is formed with a third positioning opening which is aligned, in the fitted state, with said at least one first positioning opening in said support element.

5. The fastening device according to claim 4, wherein, in the fitted state, the positioning lug of the accessory engages in said second positioning opening.

6. The fastening device according to claim 4, wherein, in the fitted state, the positioning lug of the accessory engages in said second positioning opening and in said third positioning opening.

7. The fastening device according to claim 2, wherein said holding element is formed with a further positioning opening which is aligned, in the fitted state, with said at least one first positioning opening in said support element.

8. The fastening device according to claim 1, wherein said support element is integrally formed as a single-part plastic component.

9. The fastening device according to claim 1, wherein said holding element is integrally formed as a single-part plastic component.

10. The fastening device according to claim 1, wherein the accessory includes an emblem.

11. A fastening device for fastening an accessory to a body part, the body part having an exposed side and a non-exposed side opposite from the exposed side, the fastening device comprising:
    a support element configured to be mounted, in a fitted state thereof, on the exposed side of the body part;
    a holding element configured to be mounted, in a fitted state thereof, on the non-exposed side of the body part;
    said holding element including undercut elements configured to reach, in the fitted state thereof, from the non-exposed side through corresponding openings formed in the body part and to engage behind holding contours formed on the body part;
    said support element having support latching elements each formed with mutually opposite latching lugs;
    said holding element has having mating latching elements; and
    in a fitted state, said latching lugs of said support latching elements latching to corresponding said mating latching elements of said holding element, wherein said latching elements of said support element reach through corresponding openings in the body part and in said holding element, and said mating latching elements are disposed on a side of said holding element facing away from said support element.

12. The fastening device according to claim 11, wherein at least one of said mating latching elements of said holding element is a spring-elastic tongue.

13. A fastening device for fastening an accessory to a body part, the body part having an exposed side and a non-exposed side opposite from the exposed side, the fastening device comprising:
    a support element configured to be mounted, in a fitted state thereof, on the exposed side of the body part;
    a holding element configured to be mounted, in a fitted state thereof, on the non-exposed side of the body part;
    said holding element including undercut elements configured to reach, in the fitted state thereof, from the non-exposed side through corresponding openings formed in the body part and to engage behind holding contours formed on the body part; and
    said support element includes at least one positioning lug facing towards the body part and, in the fitted state, engaging a positioning depression formed in a complementary shape in the body part.

14. A fastening device for fastening an accessory to a body part, the body part having an exposed side and a non-exposed side opposite from the exposed side, the fastening device comprising:
    a support element configured to be mounted, in a fitted state thereof, on the exposed side of the body part;
    a holding element configured to be mounted, in a fitted state thereof, on the non-exposed side of the body part;
    said holding element including undercut elements configured to reach, in the fitted state thereof, from the non-exposed side through corresponding openings formed in the body part and to engage behind holding contours formed on the body part; and
    said support element being formed with at least one positioning notch facing towards the body part and, in the fitted state, engaging with a positioning bump formed on the body part.

* * * * *